(12) United States Patent
Song (10) Patent No.: US 9,479,470 B2
(45) Date of Patent: Oct. 25, 2016

(54) METHOD AND SYSTEM OF PROVIDING AN INSTANT MESSAGING SERVICE

(71) Applicant: AYO TALK INC., Flushing, NY (US)

(72) Inventor: Sukjun Song, Fresh Meadows, NY (US)

( * ) Notice: Subject to any disclaimer, the term of this patent is extended or adjusted under 35 U.S.C. 154(b) by 302 days.

(21) Appl. No.: 14/163,620

(22) Filed: Jan. 24, 2014

(65) Prior Publication Data

US 2014/0214987 A1    Jul. 31, 2014

Related U.S. Application Data

(60) Provisional application No. 61/756,770, filed on Jan. 25, 2013.

(51) Int. Cl.
  *H04L 29/06* (2006.01)
  *H04L 12/58* (2006.01)

(52) U.S. Cl.
  CPC ............ *H04L 51/10* (2013.01); *H04L 12/581* (2013.01); *H04L 12/582* (2013.01); *H04L 12/589* (2013.01); *H04L 51/04* (2013.01); *H04L 65/4007* (2013.01)

(58) Field of Classification Search
  CPC .............. G06F 17/30265; G06F 17/30867; G06Q 10/10; G06Q 50/01; H04L 51/10; H04L 65/403; H04L 67/306; H04L 51/04; H04L 65/4007; H04L 12/581; H04L 12/582; H04L 12/589
  See application file for complete search history.

(56) References Cited

U.S. PATENT DOCUMENTS

| | | | | |
|---|---|---|---|---|
| 2008/0222295 | A1* | 9/2008 | Robinson | G06F 17/30867 709/227 |
| 2012/0278387 | A1* | 11/2012 | Garcia | G06Q 50/01 709/204 |
| 2013/0018960 | A1* | 1/2013 | Knysz | H04L 65/403 709/204 |
| 2013/0307997 | A1* | 11/2013 | O'Keefe | H04L 51/10 348/207.1 |
| 2013/0325462 | A1* | 12/2013 | Somekh | G06F 17/30265 704/235 |
| 2014/0129627 | A1* | 5/2014 | Baldwin | H04L 67/306 709/204 |
| 2014/0289323 | A1* | 9/2014 | Kutaragi | G06Q 50/01 709/203 |
| 2015/0304369 | A1* | 10/2015 | Sandholm | G06Q 10/10 715/753 |

\* cited by examiner

*Primary Examiner* — Le H Luu
(74) *Attorney, Agent, or Firm* — Antonio Ha & U.S. Patent, LLC (57) ABSTRACT

According to an exemplary embodiment of the present invention, a method and system of providing an instant message service are provided. Combined data is generated through a first terminal. The combined data is transmitted to a server through a network. The transmitted combined data is stored in a database of the server in a predetermined format. A first text is entered through the first terminal. The entered first text is transmitted to the server. Whether the combined data matches the first text is determined. When the combined data matches the first text, the combined data is transmitted to the first terminal and a second terminal that communicates with the first terminal.

11 Claims, 7 Drawing Sheets

| Txt | 1st image | 2nd image | Period (sec) |
|---|---|---|---|
| 1111 | Img1.jpg | Img2.jpg | 1 |
| ... | ... | ... | ... |
| ... | ... | ... | ... |

METHOD AND SYSTEM OF PROVIDING AN INSTANT MESSAGING SERVICE

CROSS-REFERENCE TO RELATED APPLICATION

This non-provisional application claims priority under 35 U.S.C. 119 to the U.S. Provisional Application No. 61/756,770, filed on Jan. 25, 2013, the disclosure of which is incorporated by reference herein in its entirety.

TECHNICAL FIELD

Exemplary embodiments of the present invention relate to communication over a network, and more specifically, to a system and method of providing an instant messaging service.

DISCUSSION OF RELATED ART

A number of on-line chatting or instant messaging services are currently in the market. Such services focus simply on delivery of text or captured images and thus fail to draw users' attention. As a recent trend in communication shifts from PC-to-PC to mobile-to-mobile, a demand for new mobile chatting services is on the rise.

SUMMARY

According to an exemplary embodiment of the present invention, a method of providing an instant message service is provided. In the method, combined data is generated through a first terminal. The combined data is transmitted to a server through a network. The transmitted combined data is stored in a database of the server in a predetermined format. A first text is entered through the first terminal. The entered first text is transmitted to the server. Whether the combined data matches the first text is determined. When the combined data matches the first text, the combined data is transmitted to the first terminal and a second terminal that communicates with the first terminal.

In an exemplary embodiment of the present invention, in the method, a first image is uploaded to the server. A second image is uploaded to the server. A second text is entered and is stored in the server. A period is entered and stored in the server. The first image, the second image, the second text, and the period are stored in association with one another.

The data format is configured in an order of the second text, the first image, the second image, and the period.

When the combined data does not match the first text, the first text is transmitted to the first terminal and the second terminal.

The generated combined data is stored in the first terminal.

In an exemplary embodiment of the present invention, in the method, a first image is uploaded to the server. A second image is uploaded to the server. A second text is entered and stored in the server. A predetermined default period is stored in the server. The first image, the second image, the second text, and the default period are stored in association with one another.

According to an exemplary embodiment of the present invention, a system of providing an instant message service is provided. The system comprises a first terminal configured to generate combined data. The system comprises a combined data server. The combined data server is configured to store the combined data in a database of the combined data server in a predetermined format. The combined data server is configured to receive a first text entered from the first terminal. The combined data server is configured to determine whether the combined data matches the first text. When the combined data matches the first text, the combined data server is configured to transmit the combined data to the first terminal and a second terminal that communicates with the first terminal.

The first terminal is configured to upload a first image to the server. The first terminal is configured to upload a second image to the server. The first terminal is configured to enter a second text and store the second text in the server. The first terminal is configured to enter a period and store the period in the server. The combined data server is configured to store the first image, the second image, the second text, and the period in association with one another.

The data format is configured in an order of the second text, the first image, the second image, and the period.

When the combined data does not match the first text, the first text is transmitted to the first terminal and the second terminal.

The generated combined data is stored in the first terminal.

BRIEF DESCRIPTION OF DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF EMBODIMENTS

Hereinafter, exemplary embodiments of the inventive concept will be described in detail with reference to the accompanying drawings. The inventive concept, however, may be modified in various different ways, and should not be construed as limited to the embodiments set forth herein. The same reference denotations may be used to refer to the same or substantially the same elements throughout the specification and the drawings. It will be understood that when an element or layer is referred to as being "on," "connected to," "coupled to," or "adjacent to" another element or layer, it can be directly on, connected, coupled, or adjacent to the other element or layer, or intervening elements or layers may be present. As used herein, the singular forms "a," "an," and "the" are intended to include the plural forms as well, unless the context clearly indicates otherwise.

As will be appreciated by one skilled in the art, aspects of the present inventive concept may be embodied as a system, method or computer program product. Accordingly, aspects of the present inventive concept may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive concept may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a RAM, a ROM, an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive concept may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive concept are described with reference to flowchart illustrations and/or block diagrams of methods, apparatus (systems) and computer program products according to embodiments of the inventive concept. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article or manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present inventive concept. In this regard, each block in the flowchart or block diagrams may represent a module, segment, or portion of code, which comprises one or more executable instructions for implementing the specified logical functions(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
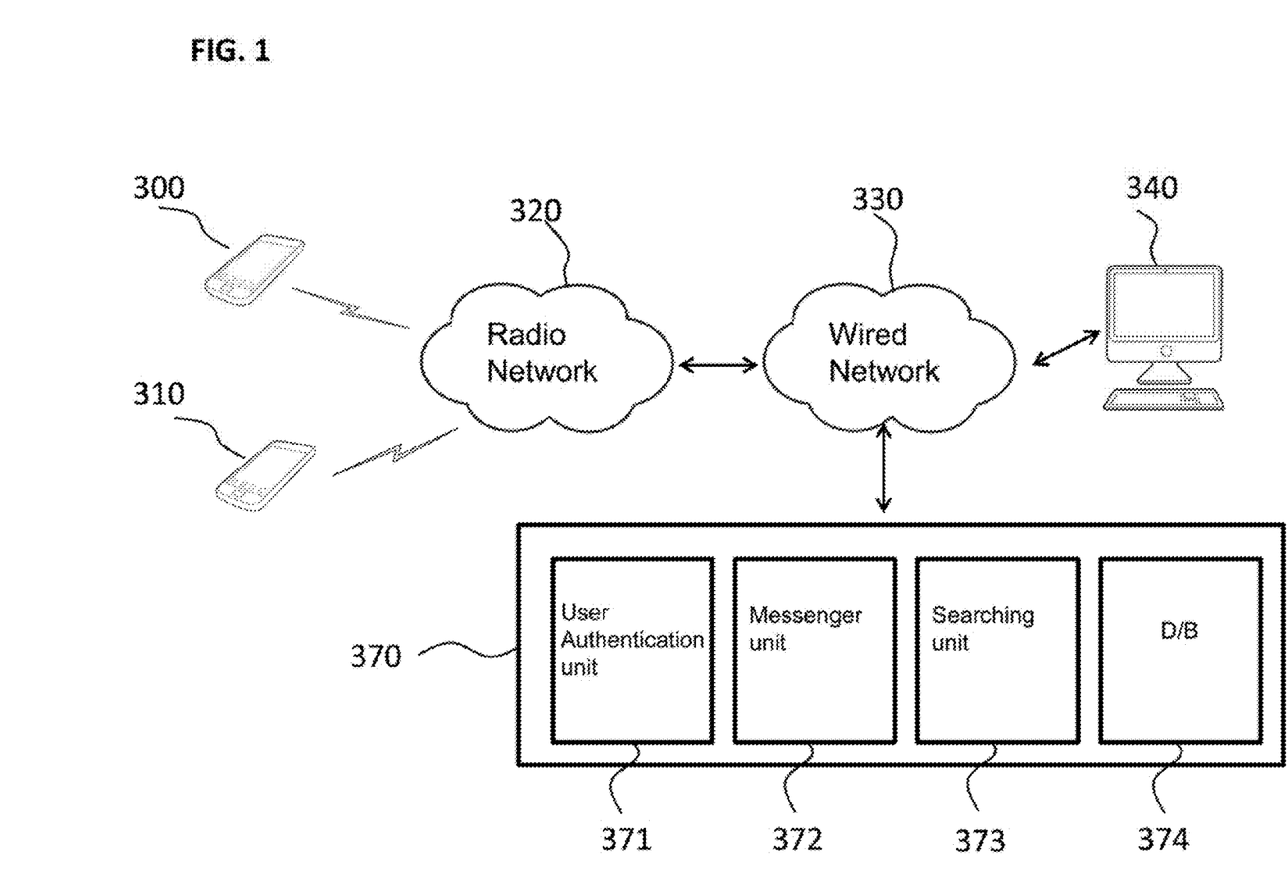
FIG. 1 is view illustrating the overall system for providing a mobile instant messaging service according to an exemplary embodiment of the present invention.

FIG. 1 is view illustrating the overall system for providing a mobile instant messaging service according to an exemplary embodiment of the present invention. Referring to FIG. 1, the mobile instant messaging system according to an exemplary embodiment of the present invention includes one or more terminals 300 and 310, a radio network 320, a wired network 330, a wired terminal 340 (for example, a personal computer (PC)), and a combined data server 370.

The terminals include a first terminal 300 and a second terminal 310. The first terminal 300 and the second terminal 310 communicate with each other via the radio network 320 and the wired network 330. Each of the first terminal 300 and the second terminal 310 may communicate with the wired terminal 340 via the radio network 320 and the wired network 330. The first terminal 300 and the second terminal 310 each may be a mobile phone or a smartphone.

According to an exemplary embodiment of the present invention, the first terminal 300 may perform an online chat with the second terminal 310 through a mobile instant messenger. The mobile instant messenger may be an application that may be executed on the first terminal 300 or the second terminal 310. For example, when the first terminal 300 executes the mobile instant messenger and sends a request signal for performing a chat with the second terminal 310, the request signal is transmitted via the radio network 320 and the wired network 330 to the combined data server 370, for example, to the messenger unit 372 of the combined data server 370. When receiving the request signal, the messenger unit 372 determines whether the second terminal 310 requested for chat is in the state where the second terminal 310 can perform a chat with the first terminal 300, and when the second terminal 310 is determined to be able to perform a chat with the first terminal 300, forms a channel (also referred to as "session") for chat between the two terminals 300 and 310. A window for chat may be popped up on the screen of each of the terminals 300 and 310, and chat may be conducted by entering messages through the window.

According to an exemplary embodiment of the present invention, the first terminal 300 or the second terminal 310 requests the combined data server 370 to send combined data by a predetermined method, and in response to such request, the combined data server 370 sends combined data to the first terminal 300 or second terminal 310. For example, the predetermined method may be entry of text that is mapped with the combined data. A detailed description will be given later.

The combined data server 370 includes a user authentication unit 371, a messenger unit 372, a searching unit 373, and a database 374.

The user authentication unit 371 determines whether the user of each terminal 300 or 310 is a subscriber for the mobile instant messaging service according to an exemplary embodiment of the present invention. In other words, the user authentication unit 371 authenticates the user of the terminal 300 or 310. Each terminal 300 or 310 may provide user information, such as, e.g., user ID and password, to the user authentication unit 371, and the user authentication unit 371 may perform user authentication based on the received user information. For example, the user provides an ID and a password when subscribing to the mobile instant messaging service to the combined data server 370, and the combined data server 370 stores the user information in the user authentication unit 371. The user information may be stored in the database 374. In this case, the user authentication unit 371 performs user authentication in association with the database 374. When the user enters his/her ID and password through his terminal 300 or 310 in a log-in process, the user authentication unit 371 receives the entered ID and password and searches the user authentication unit 371's own database or the database 374 to locate the user. When determining that there is subscriber information that matches the received ID and password, the user authentication unit 371 permits the user's access to the system.

The messenger unit 372 forms a chat channel (session) between the first terminal 300 and the second terminal 310 and a chat may be performed between the first terminal 300 and the second terminal 310.

The searching unit 373, as described below in greater detail, searches the database 374 and determines whether there is combined data that matches text entered by the user of the first terminal 300 or second terminal 310 while chatting. When there is combined data matching the entered text, the combined data server 370 sends the combined data to the first terminal 300 and the second terminal 310, and when there is no combined data matching the entered text, the combined data server 370 sends the entered text back to the first terminal 300 and second terminal 310. The searching unit 373 may make comparisons, per word, per syllable, or based on the whole text, on the text that is transmitted from the first terminal 300 or second terminal 310 to the combined data server 370. However, exemplary embodiments of the present invention are not limited thereto.

The database 374 stores data transmitted from the first terminal 300 or second terminal 310 in a predetermined format. For example, the database 374 may store the data in the format as shown in FIG. 2.

Figure 2:
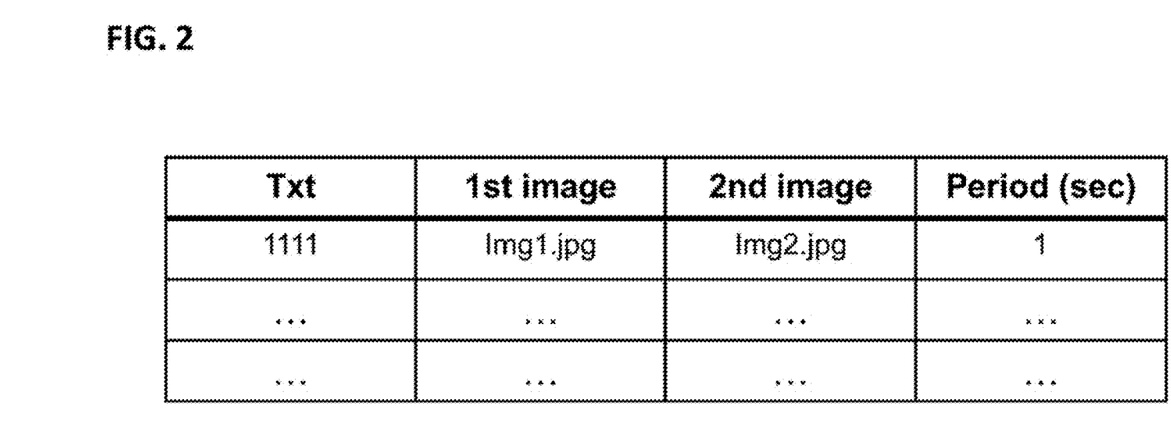
FIG. 2 is a view illustrating a data format of combined data according to an exemplary embodiment of the present invention.

FIG. 2 is a view illustrating a data format of combined data according to an exemplary embodiment of the present invention.

Referring to FIG. 2, the database 374 includes a plurality of fields. The plurality of fields includes a text field TXT, a first image field $1^{ST}$ IMG, a second image field $2^{ND}$ IMG, and a period field PD. Although, for purposes of description, two images are used, exemplary embodiments of the present invention are not limited thereto, and three or more images may be used as well.

The text field TXT represents text that is entered and stored by a user and that is mapped with a first image, a second image, and a period. The first image field $1^{ST}$ IMG and the second image field $2^{ND}$ IMG respectively represent images that are mapped with text and that are stored in the database 374. The period field PD represents a period entered by a user. The period may be stored as default. In the period, the first image and the second image are alternately and repeatedly shown.

For example, as shown in FIG. 2, when text '1111,' image 'img1.jpg,' image 'img2.jpg,' and period '1 sec' are stored in the text field TXT, the first image field $1^{ST}$ IMG, the second image field $2^{ND}$ IMG, and the period field PD, respectively, this may mean that text '1111' is mapped with image 'img1.jpg' and image 'img2.jpg' and period '1 sec.' As used herein, the term "combined data" may refer to a combination of the text, the images, and the period that are mapped with each other.

Referring back to FIG. 1, the user of the terminal 300 or 310 may enter text that is mapped with predetermined combined data on the chat window of the mobile instant messenger, and the terminal 300 or 310 may download the combined data from the combined data server 370 and may execute the combined data. A specific description of a method of executing combined data will be described below.

Although the application of combined data to communication between the first terminal 300 and the second terminal 310 has been described above, exemplary embodiments of the present invention are not limited thereto. For example, combined data that is generated by a mobile terminal, such as the first terminal 300 or the second terminal 310 may also be delivered to the wired terminal 340 during a chat session that forms between the first terminal 300 or second terminal 310 and the wired terminal 340. The first terminal 300 or second terminal 310 may perform a one-on-one chat with the wired terminal 340 via a messenger (that may be, e.g., an application for mobile phones or a computer program for personal computers). Combined data may be generated and executed in substantially the same manner as generates and executes combined data in communication between the first terminal 300 and the second terminal 310.

The radio network 320 may include, but is not limited to, a 2G, 3G, or 4G mobile network, or a LAN (Local Access Network), a WAN (Wide Access Network), or a private wireless network. For example, in case the radio network 320 is a 3G CDMA network, the radio network 320 may include, but is not limited to, a base station that performs communication with the first terminal 300 and second terminal 310, a base station controller that controls the base station, a mobile switching center that is in charge of call switching, a short message service center that provides a SMS (Short Message Service), and a packet service node that provides data services to the first terminal 300 and the second terminal 310.

Figure 3:
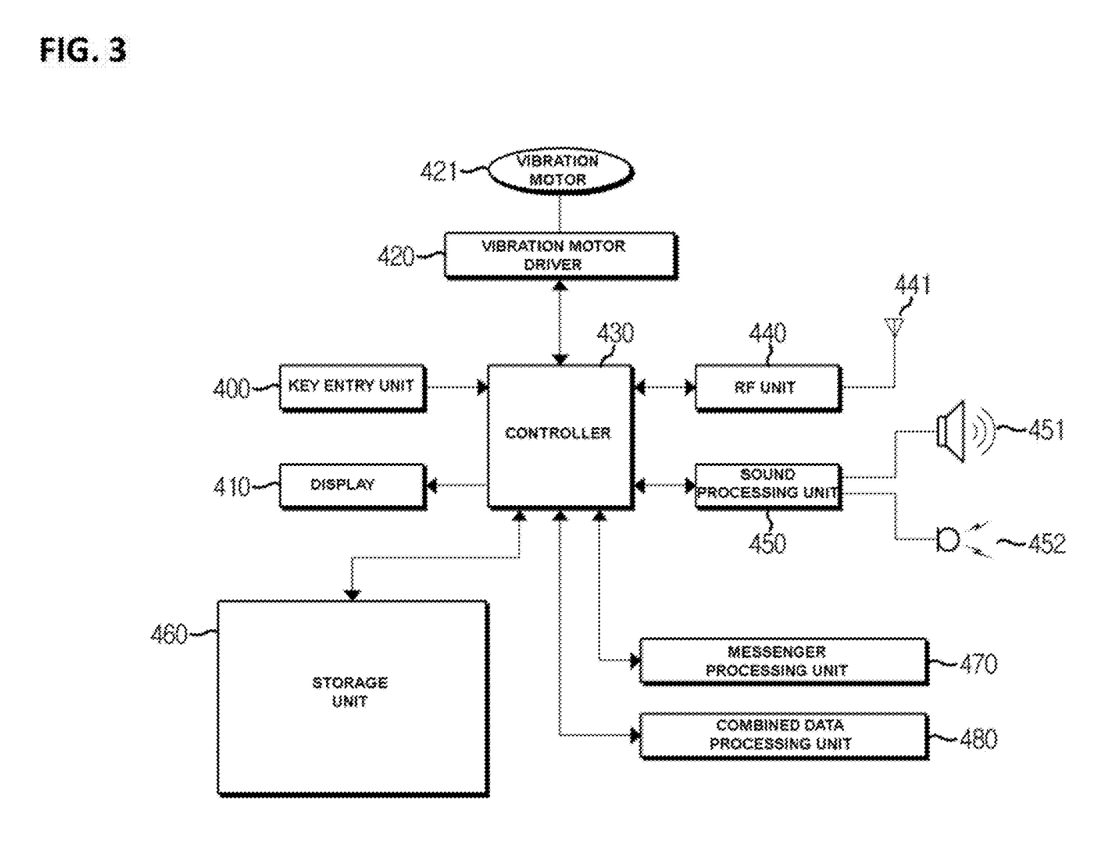
FIG. 3 is a block diagram illustrating a terminal according to an exemplary embodiment of the present invention.

FIG. 3 is a block diagram illustrating a terminal according to an exemplary embodiment of the present invention. By way of example, the terminal is the first terminal 300 described above in connection with FIG. 1.

Referring to FIG. 3, the first terminal 300 includes a key entry unit 400, a display 410, a vibration motor driver 420, a vibration motor 421, a controller 430, a RF unit 440, an antenna 441, a sound processing unit 450, a speaker 451, a microphone 452, a storage unit 460, an messenger processing unit 470, a combined data processing unit 480, and a camera 490.

The storage unit 460 may store text, a period, and images that are entered by the user of the first terminal 300 and combined data configured of the text, period, and images.

The controller 430 controls the overall operation of the first terminal 300. According to an exemplary embodiment of the present invention, the controller 430 controls the messenger processing unit 470 to execute a mobile instant messenger and the combined data processing unit 480 to generate and execute combined data.

The key entry unit 400 includes a plurality of letter/numeral keys and function keys (e.g., *, #, etc.) for performing various functions. The key entry unit 400 transfers an electrical signal of key data corresponding to the key entered by a user to the controller 430. For example, a user may enter, through the key entry unit 400, text and a period that are used for generating combined data, together with predetermined images.

The display 410 may be a display, such as LCD (Liquid Crystal Display) or OLED (Organic Light Emitting Display). The display 410 displays the state of the first terminal 300, text, images, and/or combined data under the control of the controller 430.

According to an exemplary embodiment of the present invention, the display 410 may be implemented as a touch screen display or may further include a touch screen. Various text and commands (for example, for uploading images) may be entered through the touch screen display 410. According to an exemplary embodiment of the present invention, the key entry unit 400 may implement a virtual keyboard in cooperation with the display 410 that is a touch screen display.

The display 410, for example, converts a high frequency signal received through the antenna 441 into a baseband frequency signal and outputs the converted baseband frequency signal. The display 410 may also convert a baseband frequency signal to be transmitted into a high frequency signal and outputs the high frequency signal through the antenna 441. Text, a first image, a second image, and a period that are entered by a user may be transmitted, as combined data, to the combined data server 370 through the display 410 and the antenna 441 under the control of the controller 430. Further, the first terminal 300 may receive combined data and text that are stored in the combined data server 370 from the combined data server 370 through the display 410.

The sound processing unit 450 demodulates a radio signal received through the antenna 441 and RF unit 440 and provides the demodulated signal to the speaker 451. The speaker 451 outputs a sound based on the demodulated signal. The sound processing unit 450 modulates a sound signal input from the microphone 452, and the modulated signal is transmitted by the RF unit 440 and the speaker 451.

The storage unit 460, at least temporarily, stores programs or applications for operating the other units, such as the controller 430, and data processed during the operations of the other units, such as the controller 430. The storage unit 460 also stores text, images, and period that are entered by a user and that is used for generating combined data, and generated combined data, and combined data downloaded from the combined data server 370.

According to an exemplary embodiment of the present invention, the format of the combined data stored in the storage unit 460 may be substantially the same as the format of the combined data stored in the database 374 of the combined data server 370.

The vibration motor driver 420 drives the vibration motor 421 under the control of the controller 430. For example, according to an exemplary embodiment of the present invention, when the first terminal 300 is configured to vibrate the vibration motor 421 when combined data is executed, the vibration motor driver 420 may drive the vibration motor 421 in synchronization with the execution of the combined data depending on vibration settings.

The messenger processing unit 470 generates various menus and chat windows for a mobile instant messenger when the first terminal 300 executes the mobile instant messenger, supports user authentification and other various functions of the mobile instant messenger. The messenger processing unit 470 also enables messages to be exchanged with a counterpart terminal, e.g., second terminal 310, via the mobile instant messenger. The messenger processing unit 470 may perform the above-listed functions in cooperation with the messenger unit 372 of the messenger processing unit 470.

The combined data processing unit 480 performs various functions related with processing combined data, such as, e.g., executing a mobile instant messenger, and generating, storing, and executing combined data. For example, the combined data processing unit 480 may send first and second images selected or captured in cooperation with the key entry unit 400 or display 410 that is a touch screen display, the storage unit 460 or the camera 490 to the combined data server 370 in combination with RF unit 440, under the control of the controller 430. The combined data processing unit 480 may, under the control of the controller 430, transmit text and period entered in combination with the key entry unit 400 or the display 410 that is a touch screen display to the combined data server 370 in combination with the RF unit 440.

The messenger processing unit 470 and the combined data processing unit 480 may be configured in separate modules, respectively. The messenger processing unit 470 and the combined data processing unit 480 may be implemented in hardware or software, and when implemented in software, the messenger processing unit 470 and the combined data processing unit 480 may be stored in the storage unit 460.

Although, for the purpose of description, the messenger processing unit 470 and the combined data processing unit 480 are provided in separate modules, respectively, exemplary embodiments of the present invention are not limited thereto. For example, the messenger processing unit 470 and the combined data processing unit 480 may be integrated into a single module.

The camera 490 generates images that form combined data. The camera 490 may be configured as a small camera module. The camera 490 may take picture of an object under the control of the controller 430 and may store the picture in the storage unit 460. According to an exemplary embodiment of the present invention, images captured in real-time by the camera 490 may be used as the first and second images.

Figure 4A:
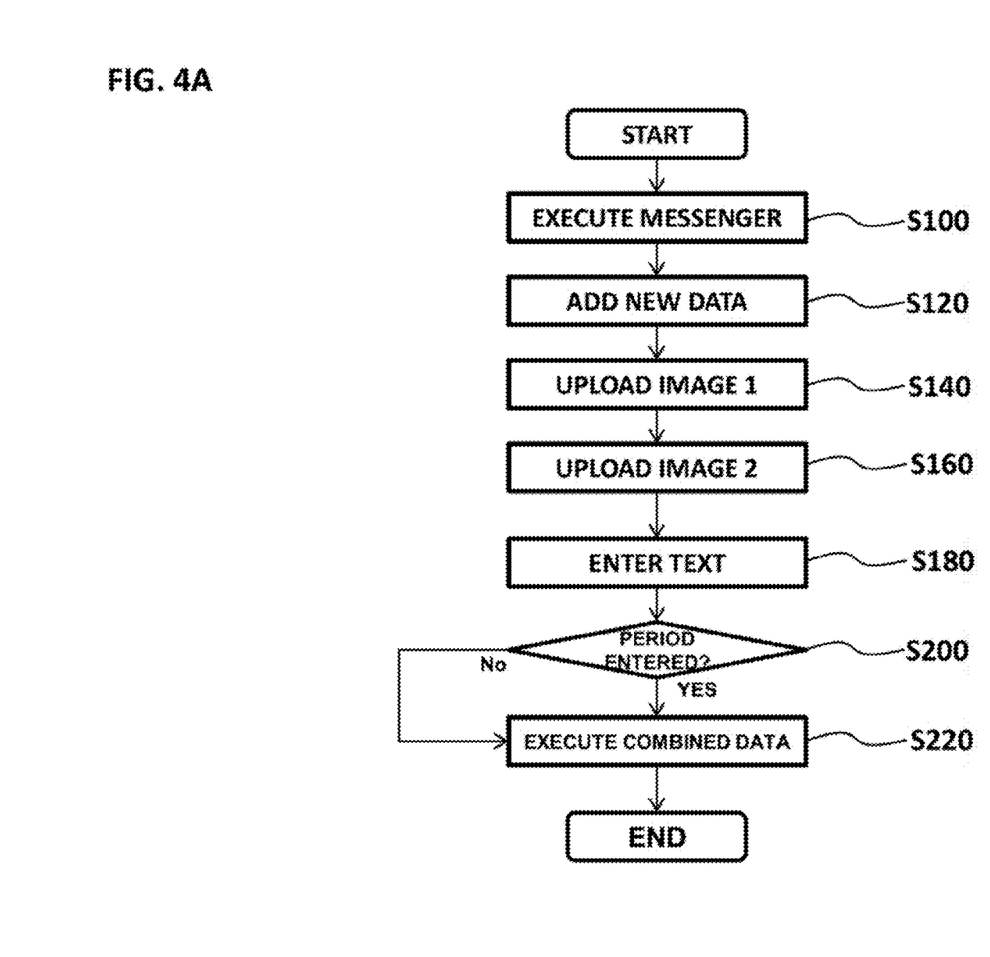
FIG. 4A is a flowchart illustrating a method for generating combined data according to an exemplary embodiment of the present invention.
Figure 4B:
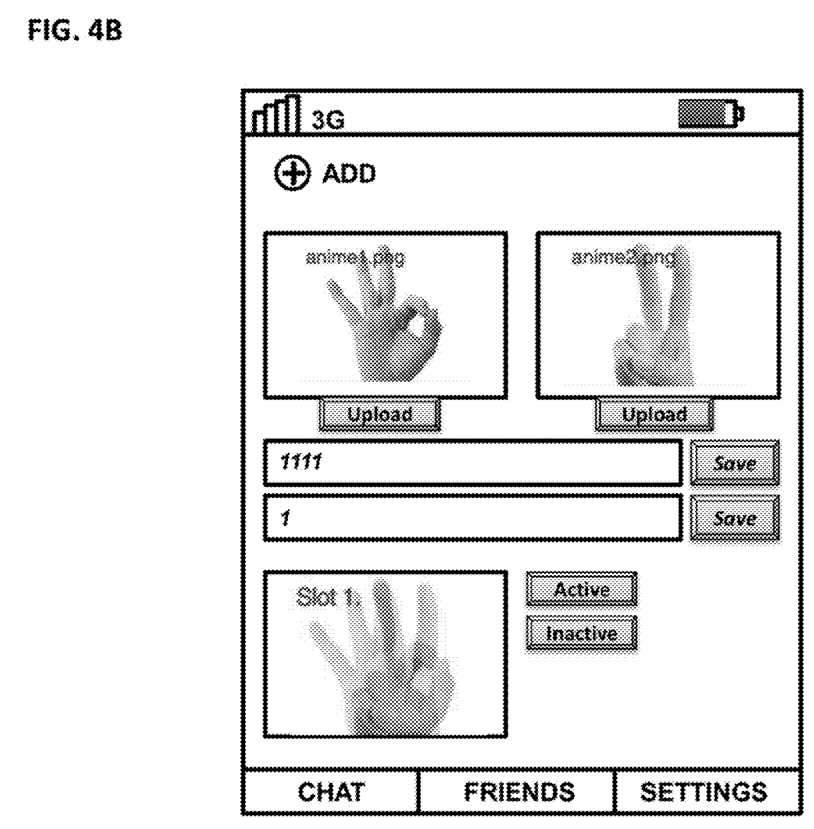
FIG. 4B is a view illustrating a user interface for generating combined data according to an exemplary embodiment of the present invention.

FIG. 4A is a flowchart illustrating a method for generating combined data according to an exemplary embodiment of the present invention. FIG. 4B is a view illustrating a user interface for generating combined data according to an exemplary embodiment of the present invention;

Referring to FIGS. 4A and 4B, a mobile instant messenger is executed (S100). The mobile instant messenger may be executed under the control of the controller 430 by the messenger processing unit 470 in cooperation with the messenger unit 372 of the combined data server 370.

When the mobile instant messenger is executed, a chatting session is established, and a menu for performing a chat is provided at a lower part of the user interface as shown in FIG. 4B. The menu may include, but is not limited to, three items respectively denoted "CHAT," "FRIENDS," and "SETTINGS." Item "CHAT" allows a user to attend a chat session. Item "FRIENDS" allows a user to view and select a friend to chat with. Item "SETTINGS" allows a user to make and change various settings. Item "SETTINGS" enables a user to generate combined data.

To generate new combined data, the icon shaped as a circled cross, which is positioned next to the "ADD" button is touched (S120). A user interface for generating combined data is then displayed as shown in FIG. 4B. The generation of combined data may be performed by the combined data processing unit 480 under the control of the controller 430.

Referring to FIG. 4B, at an upper part of the user interface is positioned the "ADD" button to add new combined data. Under the "ADD" button are positioned a first image window and a first upload button for uploading a first image and a second image window and a second upload button for uploading a second image. Under the first and second upload buttons are positioned a text entry blank for entry of text and a save button for saving the entered text.

Under the text entry blank are positioned a period entry blank for entry of a period and a save button for saving the entered period.

A preview window is provided under the period entry blank to allow a user to preview generated combined data. An "Active" button and an "Inactive" button are provided next to the preview window to enable generated combined data to be executed or stop being executed. As used herein, the terms "execute combined data" may mean alternately and repeatedly showing a plurality of images, such as the first and second images, included in the combined data at a predetermined period.

A first image is uploaded to the first image window (S140). The first image may be uploaded, for example, by selecting an image stored in the storage unit 460 by touching the display 410 that is a touch screen display through the first upload button or by using an image captured by the camera 490. The combined data processing unit 480 may upload the first image under the control of the controller 430 in combination with the storage unit 460 or camera 490 and the key entry unit 400 or display 410 that is a touch screen display and the combined data server 370.

A second image is uploaded to the second image window (S160). The second image may be uploaded in substantially the same manner as step S140. According to an exemplary embodiment of the present invention, the first terminal 300 may be configured to send the first and second images to the combined data server 370 upon completion of uploading the first and second images.

Text that is to be mapped with the uploaded first and second images is entered through the text entry blank (S180). The text entered may be letter(s), numeral(s), or symbol(s) and is not limited thereto. Entry of the text may be carried out by a physical keyboard, for example, the key entry unit 400, or by a virtual keyboard that is displayed on the display 410 that is a touch screen display. After entry of the text, the save button may be touched or key-entered, and thus, the text may be stored in the storage unit 460 or transmitted to the combined data server 370.

Under the control of the controller 430, the combined data processing unit 480 determines whether a period at which the first and second images are alternatively and repeatedly shown is entered (S200). The period may be entered as, e.g., a numeral, using the physical or virtual keyboard like entry of text. Entry of a period may be skipped. According to an exemplary embodiment of the present invention, when entry of a period is omitted, a predetermined value (e.g., 1 sec) may be stored in the storage unit 460 or transmitted to the combined data server 370. After entry of the period, the save button is touched or key-entered and thus the entered period may be stored in the storage unit 460 and transmitted to the combined data server 370.

The "Active" button is touched or key-entered and thus combined data is generated and executed based on the uploaded first and second images and entered text and period (S220). According to an exemplary embodiment of the present invention, the combined data may be generated and executed based on the first and second images, text, and period stored in the storage unit 460 or based on the first and second images, text, and period received from the combined data server 370.

Further, according to an exemplary embodiment of the present invention, when first and second images are uploaded, and text and a period are entered, the image, text, and period each may be stored in the database 374 of the combined data server 370 in the format shown in FIG. 2. Alternatively, the first and second images, text, and period may be temporarily stored in the storage unit 460 of the first terminal 300, and when the "Active" button is touched (or pressed) (or a predetermined command is entered), the first and second images, text, and period may be sent to the combined data server 370 substantially at the same time and may be stored in the database 374 of the combined data server 370.

Figure 5A:
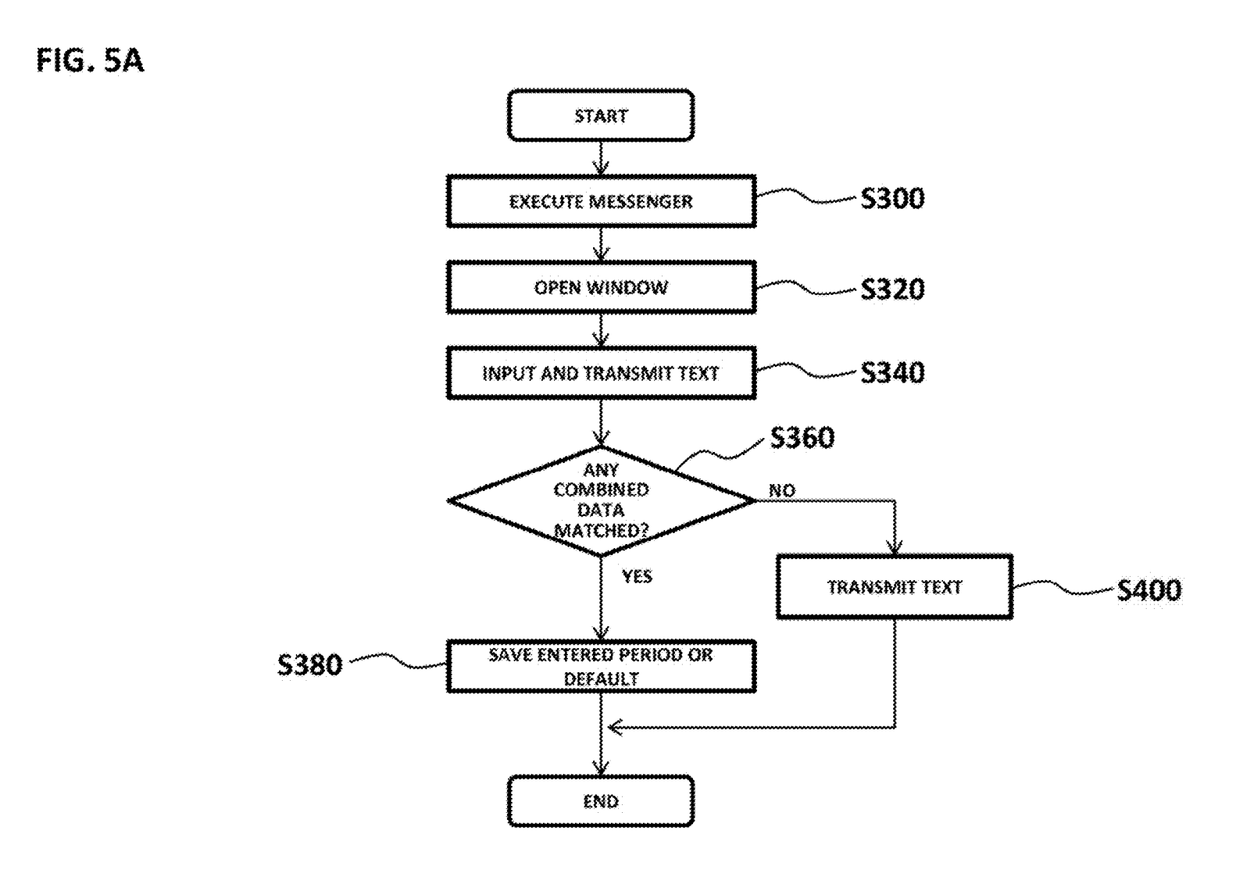
FIG. 5A is a flowchart illustrating a method for executing combined data in an online chatting according to an exemplary embodiment of the present invention.
Figure 5B:
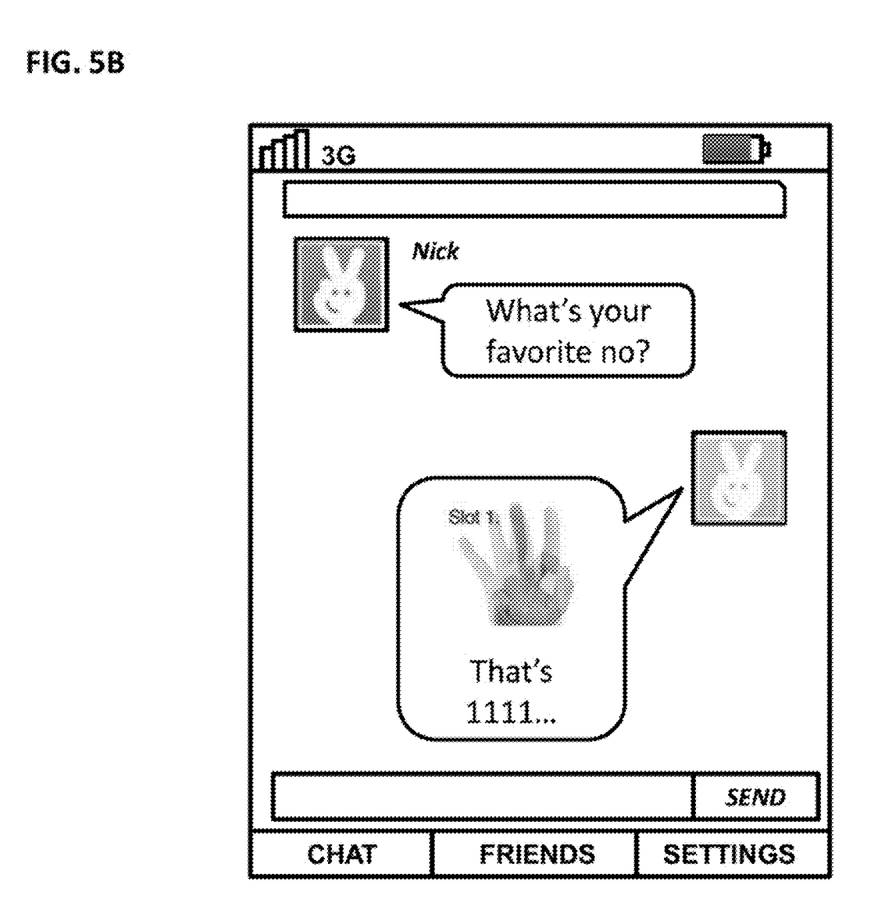
FIG. 5B is a view illustrating a user interface for executing combined data in an online chatting according to an exemplary embodiment of the present invention.

FIG. 5A is a flowchart illustrating a method for executing combined data in an online chatting according to an exemplary embodiment of the present invention. FIG. 5B is a view illustrating a user interface for executing combined data in an online chatting according to an exemplary embodiment of the present invention.

Referring to FIG. 5A, a mobile instant messenger is executed (S300). The execution of the mobile instant messenger may be performed by the messenger processing unit 470 under the control of the controller 430.

An opposite party with which a chat is to be conducted is selected, and a window for performing the chat with the fried (simply referred to as "chat window") is opened (S320). The opening of the chat window may be performed by the messenger processing unit 470 under the control of the controller 430.

Text is entered (S320). Entry of the text may be carried out by the key entry unit 400 or the display 410 that is a touch screen display. For purposes of description, text '1111' is stored in the database 374 of the combined data server 370, while mapped with the first image, the second image, and the period (e.g., 1 sec).

When the "Send" button is pressed (or touched), the entered text is transmitted to the combined data server 370 via the RF unit 440, the antenna 441, the radio network 320, and the wired network 330, under the control of the controller 430 (S340).

The combined data server 370 determines whether the database 374 stores combined data with text '1111' based on the received text '1111.' (S360). In other words, the combined data server 370 determines whether there is combined data that matches the received text '1111.' For example, the searching unit 373 of the combined data server 370 searches the database 374 to determine whether there is the same text as the received text. The received text may be temporarily stored in a buffer, for example.

In the instant embodiment of the present invention, combined data that is stored in the format of "1111 (text)-first image (img.jpg)-second image (img.jpg)-period (1 sec)" is stored in the database 374 of the combined data server 370. Accordingly, the combined data server 370 transmits the combined data "1111 (text)-first image (img.jpg)-second image (img.jpg)-period (1 sec)" to the first terminal 300 and the opposite terminal (e.g., second terminal 310) (S380). According to an exemplary embodiment of the present invention, the combined data server 370 may send the combined data, together with the received text '1111' to the first terminal 300 and the second terminal 310.

Each of the terminals 300 and 310 executes the received combined data on its chat window. For example, the combined data processing unit 480 executes the combined data so that the first image and the second image are alternately shown with a repetition period of 1 sec on the chat window, under the control of the controller 430. According to an exemplary embodiment of the present invention, the combined data processing unit 480 may display the received text '1111' on the chat window while executing the combined data.

Although in this embodiment of the present invention, combined data that is mapped with text '1111' is stored in the database 374 of the combined data server 370, exemplary embodiments of the present invention are not limited thereto. For example, when there is no combined data that is mapped with the received text (for example, when a user enters text '1110' that is mapped with any combined data) (No in step S360), the combined data server 370 determines that there is no combined data that is mapped with text '1110' and transmits the received text '1110' to each of the terminal 300 and 310 (S400).

Each of the terminals 300 and 310 displays the received text '1110' on the chat window.

While the inventive concept has been shown and described with reference to exemplary embodiments thereof, it will be apparent to those of ordinary skill in the art that various changes in form and detail may be made thereto without departing from the spirit and scope of the inventive concept as defined by the following claims.

What is claimed is:

1. A method of providing an instant message service, the method comprising:
   generating combined data through a first terminal;
   transmitting the combined data to a server through a network and storing the combined data in a database of the server in a predetermined format;
   entering a first text through the first terminal and transmitting the first text to the server;
   determining whether the combined data matches the first text; and
   when the combined data matches the first text, transmitting the combined data to the first terminal and a second terminal that communicates with the first terminal,
   wherein the combined data includes a first image, a second image, and a period at which the first image and the second image are alternately changed.

2. The method of claim 1, further comprising:
   uploading the first image to the server; uploading the second image to the server; entering a second text and storing the second text in the server; entering the period and storing the period in the server; and storing the first image, the second image, the second text, and the period in association with one another.

3. The method of claim 2, wherein the data format is configured in an order of the second text, the first image, the second image, and the period.

4. The method of claim 1, wherein when the combined data does not match the first text, the first text is transmitted to the first terminal and the second terminal.

5. The method of claim 1, wherein the generated combined data is stored in the first terminal.

6. The method of claim 1, further comprising:
   uploading a first image to the server; uploading a second image to the server; entering a second text and storing the second text in the server; storing a predetermined default period in the server; and storing the first image, the second image, the second text, and the default period in association with one another.

7. A system of providing an instant message service, the system comprising:
   a first terminal configured to generate combined data; and
   a combined data server configured to store the combined data in a database of the combined data server in a predetermined format, wherein the combined data server is configured to receive a first text entered from the first terminal, to determine whether the combined data matches the first text, and when the combined data matches the first text, to transmit the combined data to the first terminal and a second terminal that communicates with the first terminal,
   wherein the combined data includes a first image, a second image, and a period at which the first image and the second image are alternately changed.

8. The system of claim 7, wherein the first terminal is configured to upload the first image to the server, to upload a second image to the server, to enter a second text and store the second text in the server, to enter the period and store the period in the server, and wherein the combined data server is configured to store the first image, the second image, the second text, and the period in association with one another.

9. The system of claim 8, wherein the data format is configured in an order of the second text, the first image, the second image, and the period.

10. The system of claim 7, wherein when the combined data does not match the first text, the first text is transmitted to the first terminal and the second terminal.

11. The system of claim 7, wherein the generated combined data is stored in the first terminal.

* * * * *